(12) United States Patent
Xu et al.

(10) Patent No.: US 11,181,287 B2
(45) Date of Patent: Nov. 23, 2021

(54) CONTROL METHOD FOR HEATING OPERATION OF AIR-CONDITIONER BASED ON COIL TEMPERATURE AND INDOOR FAN SPEED

(71) Applicant: QINGDAO HAIER AIR CONDITIONER GENERAL CORP., Qingdao (CN)

(72) Inventors: Beibei Xu, Qingdao (CN); Juke Liu, Qingdao (CN); Lin Ma, Qingdao (CN); Jian Miao, Qingdao (CN); Xiangjun Li, Qingdao (CN); Jinlong Liu, Qingdao (CN); Huihua Wang, Qingdao (CN); Yongfu Cheng, Qingdao (CN)

(73) Assignee: QINGDAO HAIER AIR CONDITIONER GENERAL CORP., LTD., Qingdao (CN)

( * ) Notice: Subject to any disclaimer, the term of this patent is extended or adjusted under 35 U.S.C. 154(b) by 228 days.

(21) Appl. No.: 16/475,074

(22) PCT Filed: May 26, 2017

(86) PCT No.: PCT/CN2017/086058
§ 371 (c)(1),
(2) Date: Jun. 28, 2019

(87) PCT Pub. No.: WO2018/176621
PCT Pub. Date: Oct. 4, 2018

(65) Prior Publication Data
US 2019/0323717 A1    Oct. 24, 2019

(30) Foreign Application Priority Data
Mar. 30, 2017   (CN) .......................... 201710199530.7

(51) Int. Cl.
*F24F 11/30*    (2018.01)
*F24F 11/77*    (2018.01)
(Continued)

(52) U.S. Cl.
CPC .............. *F24F 11/30* (2018.01); *F24F 11/77* (2018.01); *F24F 11/65* (2018.01); *F24F 11/85* (2018.01);
(Continued)

(58) Field of Classification Search
None
See application file for complete search history.

(56) References Cited

U.S. PATENT DOCUMENTS 4,766,735 A * 8/1988 Gotou ....................... F25B 5/00
                                                       62/175
6,102,114 A * 8/2000 Nishihara ............. F25B 49/025
                                                       165/207
(Continued)

FOREIGN PATENT DOCUMENTS

| CN | 104501360 | 4/2015 |
| CN | 105222277 | 1/2016 |

(Continued)

OTHER PUBLICATIONS

English translation of Hasegawa et al. Japanese Patent Publication No. JP H0678839, published Oct. 5, 1994.*
English translation of Cheng et al. Chinese Patent Publication No. CN 104713196, published Jun. 17, 2015.*

*Primary Examiner* — Bernard G Lindsay
(74) *Attorney, Agent, or Firm* — Jiwen Chen; Jacobson Holman PLLC (57) ABSTRACT

A heating mode control method of an air conditioner, comprises: obtaining an indoor temperature and calculating the difference between the indoor temperature and an indoor target temperature to obtain an indoor temperature differ-
(Continued)

ence as air conditioner running at heating mode; performing a coil temperature control process as the indoor temperature difference in a set indoor temperature difference range, wherein the coil temperature control process including: obtaining an indoor coil temperature and controlling the frequency of the compressor according to the indoor coil temperature and a coil target temperature. The application of the method can achieve the purpose of improving the heating effect by increasing the outlet air temperature, thus improving the heating performance of an air-conditioner.

8 Claims, 4 Drawing Sheets

(51) Int. Cl.
  *F24F 11/85* (2018.01)
  *F24F 11/65* (2018.01)
  *F24F 110/10* (2018.01)
(52) U.S. Cl.
  CPC ... *F24F 2110/10* (2018.01); *F25B 2600/0253* (2013.01)

(56) References Cited

U.S. PATENT DOCUMENTS

| | | | |
|---|---|---|---|
| 6,397,610 B1 * | 6/2002 | Weng | F25B 47/022 62/179 |
| 2012/0061068 A1 * | 3/2012 | Anderson | F24F 11/30 165/254 |
| 2013/0167571 A1 * | 7/2013 | Nakagawa | F24F 11/0008 62/176.4 |
| 2015/0094865 A1 * | 4/2015 | Choi | G06F 3/0488 700/278 |
| 2015/0204592 A1 * | 7/2015 | Iwasaki | F25B 13/00 62/156 |
| 2015/0211757 A1 | 7/2015 | Mutchnik et al. | |

FOREIGN PATENT DOCUMENTS

| | | |
|---|---|---|
| CN | 105485856 | 4/2016 |
| CN | 106016600 | 10/2016 |
| CN | 106500242 | 3/2017 |
| CN | 106524433 | 3/2017 |
| KR | 2000200017090 | 3/2002 |

* cited by examiner

CONTROL METHOD FOR HEATING OPERATION OF AIR-CONDITIONER BASED ON COIL TEMPERATURE AND INDOOR FAN SPEED

This is a U.S. national stage application of PCT Application No. PCT/CN2017/086058 under 35 U.S.C. 371, filed May 26, 2017 in Chinese, claiming priority of Chinese Application No. 201710199530.7, filed Mar. 30, 2017, which is hereby incorporated by reference.

FIELD OF THE INVENTION

The invention belongs to the technical field of air conditioning, in particular to the control of an air conditioner, more specifically, is a control method involving the heating operation of an air conditioner.

DESCRIPTION OF THE RELATED ART

In the prior art, the standard way for an air conditioner to adjust indoor temperature is to control the compressor running at frequencies according to the difference between detected temperature input by an intake air sensor and a target temperature set by the user, that is to say, to stabilize the room temperature by enabling the compressor running at different frequencies. But in this model, the detected temperature of the intake air sensor is regarded as the room temperature: if the detected temperature of the intake air sensor reaches the target value, it is deemed that the room temperature reaches the target temperature. In practice, because the intake air sensor of air conditioner, especially the wall-mounted type, is arranged at a high position, the detected temperature is higher than the average temperature as the air conditioner running at heating mode, and therefore the frequency of the compressor may be reduced before reaching the target temperature, which further causes the average room temperature, particularly the temperature of area where people stay are lower than the target temperature set by the user. This situation may exert negative effect on the overall heating performance of air conditioner and the room environment may fail to meet the human comfort requirements.

The object of the present invention is to provide a control method for heating operation of air conditioner, which improves the heating performance of the air conditioner by increasing the outlet temperature of air.

SUMMARY OF THE INVENTION

In accordance with the present invention, the above and other objects can be accomplished by providing:

A heating mode control method of an air conditioner, comprising:

Obtaining an indoor temperature and calculating the difference between the indoor temperature and an indoor target temperature to obtain an indoor temperature difference as air conditioner running at heating mode;

Performing a coil temperature control process as the indoor temperature difference in a set indoor temperature difference range, wherein the coil temperature control process includes:

Obtaining an indoor coil temperature and controlling the frequency of the compressor according to the difference between the indoor coil temperature and a coil target temperature.

Preferably, the control of the compressor frequency according to the difference between the indoor coil temperature and the coil target temperature including:

Calculating the difference between the indoor coil temperature and the coil target temperature to obtain a coil temperature difference; performing a coil temperature PID calculation to obtain a first target frequency according to the coil temperature difference; and performing a frequency control on the compressor in which the first target frequency is used as the target frequency.

As the method described above, for an air conditioner in which the user is not allowed manually adjusting the set wind speed, during the coil temperature control process includes:

If the coil temperature difference is less than the first coil temperature difference threshold, performing the frequency control on the compressor in which the first target frequency is used as the target frequency and reducing the wind speed of the indoor fan; wherein the first coil temperature difference threshold is less than 0° C.;

If the coil temperature difference is greater than the second coil temperature difference threshold, performing the frequency control on the compressor in which the first target frequency is used as the target frequency and increasing the wind speed of the indoor fan; wherein the second coil temperature difference threshold is greater than 0° C.;

If the coil temperature difference is not greater than the second coil temperature difference threshold, performing the frequency control on the compressor in which the first target frequency is used as the target frequency and maintaining the wind speed of the indoor fan unchanged.

As the method described above, for an air conditioner in which the user is allowed manually adjusting the set wind speed, during the coil temperature control process includes:

If the coil temperature difference is less than the first coil temperature difference threshold, enabling the indoor fan to run at a set wind speed if the set wind speed is lower than the current wind speed and performing the frequency control on the compressor in which the first target frequency is used as the target frequency; wherein the first coil temperature difference threshold is less than 0° C.;

If the coil temperature difference is less than the first coil temperature difference threshold, enabling the indoor fan to run at a set wind speed if the set wind speed is higher than the current wind speed and performing the frequency control on the compressor in which the sum of the first target frequency and a compensation frequency is used as the target frequency; wherein the compensation frequency is greater than 0 Hz;

If the coil temperature difference is less than the first coil temperature difference threshold, enabling the indoor fan to run at a wind speed that is the difference between the set wind speed and a compensated wind speed if the set wind speed is maintained unchanged and performing the frequency control on the compressor in which the first target frequency is used as the target frequency, wherein the compensated wind speed is higher than 0 rpm.

The method as described above, in the coil temperature control process includes:

If the coil temperature difference is greater than the second coil temperature difference threshold, enabling the indoor fan to run at a set wind speed if the set wind speed is higher than the current wind speed and performing the frequency control on the compressor in which the first target frequency is used as the target frequency, wherein the second coil temperature difference threshold is greater than 0° C.;

If the coil temperature difference is greater than the second coil temperature difference threshold, enabling the indoor fan to run at a set wind speed if the set wind speed is lower than the current wind speed and performing the frequency control on the compressor in which the difference between the first target frequency and a compensation frequency is used as the target frequency;

If the coil temperature difference is greater than the second coil temperature difference threshold, enabling the indoor fan to run at a wind speed that is the sum of the set wind speed and the compensated wind speed if the set wind speed is maintained unchanged and performing the frequency control on the compressor in which the first target frequency is used as the target frequency.

According to the method as described above, in the coil temperature control process, if the coil temperature difference is greater than or equal to the first coil temperature difference threshold and the coil temperature difference is less than or equal to the second coil temperature difference threshold, performing the frequency control on the compressor in which the first target frequency is used as the target frequency and the wind speed of the indoor fan is maintained unchanged In the method as described above, the set indoor temperature difference range is [−t1° C., t2° C.], wherein t1 and t2 satisfying: 0<t1<t2.

The method as described above further includes:

If the indoor temperature difference is lower than −t1° C., performing a room temperature control process which includes:

performing a room temperature PID calculation to obtain a second target frequency according to the indoor temperature difference, performing a frequency control on the compressor of air conditioner in which the second target frequency is used as the target frequency.

Preferably, the method further includes:

in the room temperature control process, controlling the indoor fan to run at a set wind speed.

The method as described above further includes:

If the indoor temperature is greater than t2° C., controlling the compressor to running at a minimum frequency and controlling the indoor fan to run at a minimum wind speed.

Effects of the Invention

Compared with the prior art, according to the control method for heating operation of air conditioner disclosed by the present invention, when the indoor temperature difference reaches the set indoor temperature difference range, or the indoor temperature is close to the indoor target temperature, the coil temperature control process is being performed in which the compressor frequency is controlled on the basis of the indoor coil temperature and the coil target temperature instead of the room temperature. With a reasonable preset coil target temperature, it is possible to obtain a higher compressor operating frequency on the basis of the indoor coil temperature and the coil target temperature under the condition that the indoor temperature is close to the indoor target temperature. The compressor running at a higher frequency could increase the indoor coil temperature. The increased indoor coil temperature could further increase the outlet air temperature of the indoor unit to make the room temperature comparatively higher. Accordingly, the compressor could avoid running at a reduced frequency because the detected temperature is mistaken for reaching the target temperature to prevent the problem that the room temperature is lower than the set target temperature, therefore improving the heating performance of air conditioner.

Advantages and features of the present disclosure and methods for accomplishing the same will be more clearly understood from exemplary embodiments described below with reference to the accompanying drawings.

DETAILED DESCRIPTION OF THE EMBODIMENTS

The present invention will be further described in detail below with reference to the drawings and embodiments.

Figure 1:
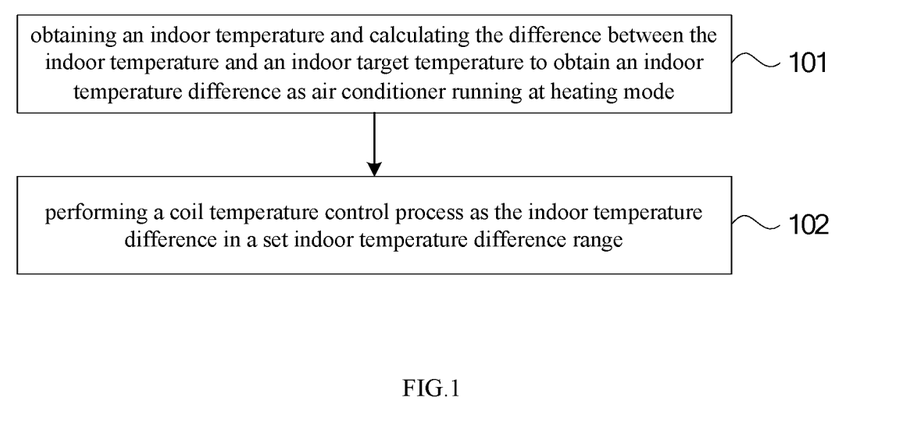
FIG. 1 is a flow chart showing an embodiment of a heating mode control method of an air conditioner according to an embodiment of the present invention.

FIG. 1 is a flow chart showing an embodiment of a control method for heating operation of air conditioner based on the present invention.

In this embodiment, the heating operation of air conditioner is achieved by the following steps:

Step 101: obtaining an indoor temperature and calculating the difference between the indoor temperature and an indoor target temperature to obtain an indoor temperature difference as air conditioner running at heating mode.

Wherein the indoor temperature refers to a real-time indoor temperature of the room where the indoor unit of air conditioner is arranged measured at a sampling rate as the air conditioner running at heating mode; the indoor temperature could be obtained by those means already available to the public, such as using a temperature sensor disposed at or near the air inlet of the air conditioner to detect an inlet air temperature and using the inlet air temperature as the indoor temperature. The indoor target temperature is a desired temperature set by the user, or a recommended temperature calculated by the algorithm of the air conditioner, or a default value stored in the air conditioner representing a desired room temperature. The difference between the indoor temperature and the indoor target temperature is defined as the indoor temperature difference.

Step 102: Performing a coil temperature control process as the indoor temperature difference in a set indoor temperature difference range.

Wherein the set indoor temperature difference range is a known temperature range, if the indoor temperature difference is in the set indoor temperature range, it indicates that the indoor temperature is close to the indoor target temperature. Under this condition, the coil temperature control process is being performed; to be specific, it includes: obtaining an indoor coil temperature and controlling the frequency of the compressor according to the difference between the indoor coil temperature and a coil target temperature.

Wherein the indoor coil temperature is a real-time coil temperature of the heat exchanger in the indoor unit of air conditioner, which could be detected at a set sampling rate by a temperature sensor disposed at the heat exchanger in the indoor unit of air conditioner; the coil target temperature is a desired temperature of the heat exchanger coil in the indoor unit of air conditioner aimed for, which could be a default temperature value preset in the control program in manufacturing, or a temperature value set by the user of the air conditioner. If the user hopes to set the coil target temperature, the air conditioner will provide with a recommended value. Both of the preset coil target temperature and the recommended coil target temperature are in the range from 42° C. to 56° C., and preferably 50° C.

As a preferred embodiment, the frequency control of the compressor of the air conditioner according to the indoor coil temperature and the coil target temperature includes:

Calculating the difference between the indoor coil temperature and the coil target temperature to obtain a coil temperature difference; performing a coil temperature PID calculation to obtain a first target frequency according to the coil temperature difference; performing a frequency control on the compressor in which the first target frequency is used as the target frequency; wherein the specific coil temperature PID calculation algorithm to obtain a first target frequency could refer to the PID calculation algorithm used in the prior art in which the target frequency of the compressor is calculated according to room temperature; wherein an initial frequency of the coil temperature PID calculation is a preset initial frequency. Preferably, the initial frequency of the coil temperature PID calculation is the frequency of the compressor measured as the indoor temperature difference reaching the set indoor temperature difference range to perform the coil temperature control process.

The coil temperature control process also could include the steps shown in the flow charts of FIG. 3 or FIG. 4, which will be described in detail as follows with respect to FIG. 3 and FIG. 4.

According to the control method for heating operation of air conditioner disclosed by the embodiment, when the indoor temperature difference reaches the set indoor temperature difference range, or the indoor temperature is close to the indoor target temperature, the coil temperature control process is being performed in which the compressor frequency is controlled on the basis of the indoor coil temperature and the coil target temperature instead of the room temperature. With a reasonable preset coil target temperature, it is possible to obtain a higher compressor operating frequency on the basis of the indoor coil temperature and the coil target temperature under the condition that the indoor temperature is close to the indoor target temperature. The compressor running at a higher frequency could increase the indoor coil temperature. The increased indoor coil temperature could further increase the outlet air temperature of the indoor unit to make the room temperature comparatively higher. Accordingly, the compressor could avoid running at a reduced frequency because the detected temperature is mistaken for reaching the target temperature to prevent the problem that the room temperature is lower than the set target temperature, therefore improving the heating performance of air conditioner.

Figure 2:
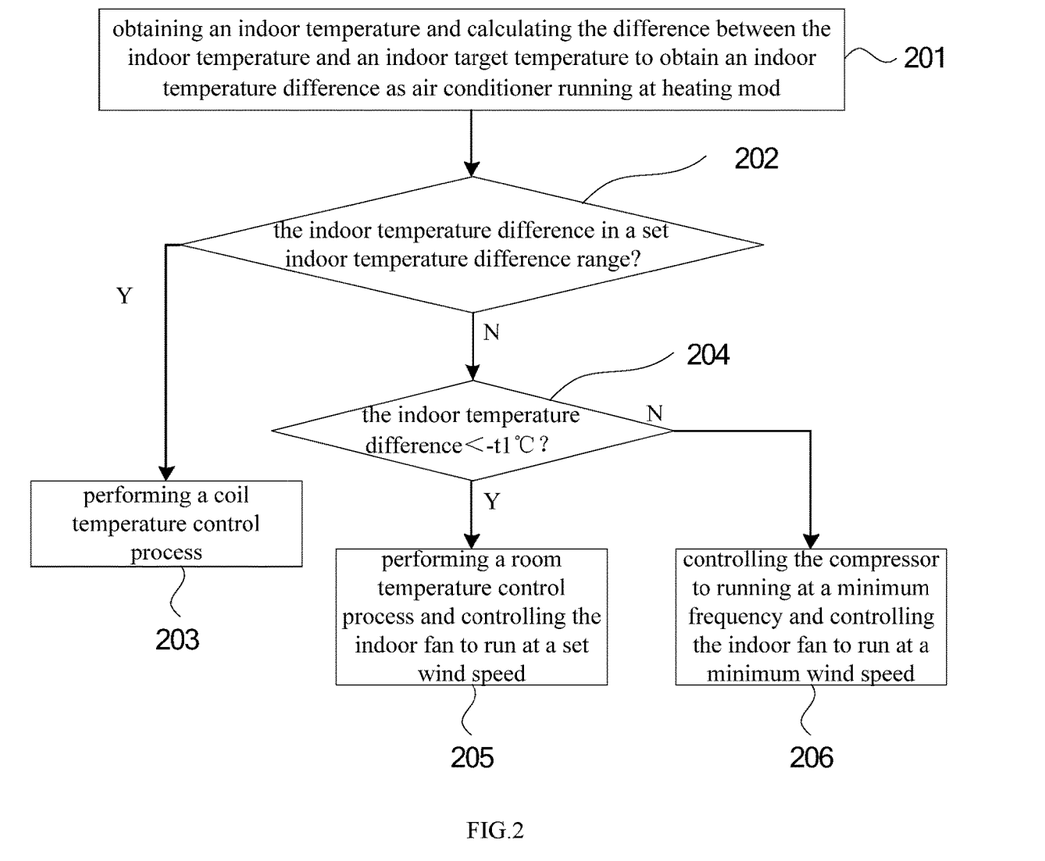
FIG. 2 is a flow chart showing another embodiment of a heating mode control method of an air conditioner according to the present invention.

FIG. 2 is a flow chart showing another embodiment of a control method for heating operation of air conditioner according to the present invention.

As shown in FIG. 2, the control method for heating operation of air conditioner includes the following steps:

Step 201: obtaining an indoor temperature and calculating the difference between the indoor temperature and an indoor target temperature to obtain an indoor temperature difference as air conditioner running at heating mode.

The parameter definition and the specific process of the Step 201 could be referred to the detailed description of the embodiment shown in FIG. 1.

Step 202: determining whether the indoor temperature difference is in a set indoor temperature difference range; if it is in the set indoor temperature difference range, performing Step 203; otherwise, performing Step 204.

Step 203: performing a coil temperature control process as the indoor temperature difference is in the set indoor temperature difference range.

In this embodiment, the set indoor temperature difference range is [−t1° C., t2° C.], wherein t1 and t2 satisfying: 0<t1<t2; as an example, t1=0.5° C., t2=3° C.; such that if the indoor temperature is lower than the indoor target temperature and the indoor temperature is lower than the indoor target temperature by 0.5° C. or less, performing the coil temperature control process; and also if the indoor temperature is higher than the indoor target temperature and the indoor temperature is higher than the indoor target temperature by 3° C. or more, performing the coil temperature. The constraint condition that t2 is greater than t1 is to extend the coil temperature control process to avoid the situation that the compressor stops running as reaching the indoor target temperature in a very short time, which may exert a negative effect on the heating effect of the air conditioner.

The coil temperature control process also could include the steps shown in the flow chart of FIG. 3 or FIG. 4, which will be described in detail as follows with respect to FIG. 3 and FIG. 4.

Step 204: determining whether the indoor temperature difference is lower than −t1° C. if in Step 202 it is determined that the indoor temperature difference is not in the set indoor temperature difference range; if the indoor temperature difference is lower than −t1° C., performing Step 205; otherwise, performing Step 206.

Step 205: performing a room temperature control process if the indoor temperature is less than −t1° C. and controlling an indoor fan to run at a set wind speed.

Wherein if it is determined that the indoor temperature difference is less than −t1° C. in Step 204, it indicates that the current indoor temperature is far less than the indoor target temperature; under this condition a room temperature control process is performed, in which the control of the compressor frequency is based on the indoor temperature and the indoor target temperature. In this preferred embodiment the room temperature control process includes: performing a room temperature PID calculation to obtain a second target frequency according to the indoor temperature difference, performing a frequency control on the compressor of air conditioner in which the second target frequency is used as the target frequency; in the meanwhile controlling an indoor fan to run at a set wind speed as performing the indoor temperature control process.

Step 206: controlling the compressor to running at a minimum frequency if the indoor temperature is not less than −t1° C. and controlling the indoor fan to run at a minimum wind speed.

Wherein if it is determined that the indoor temperature difference is not less than −t1° C. in Step 204, it indicates that the current indoor temperature is greater than t2° C. because in Step 202, it was determined that the indoor temperature difference does not belong to the set indoor temperature difference range [−t1° C., t2° C.], such that the indoor temperature is much higher than the indoor target temperature; under this condition, the compressor will be controlled to operate at the minimum frequency, and the indoor fan will be controlled to operate at the minimum wind speed, thereby achieving a warm and comfortable adjustment effect and saving energy at the same time.

Figure 3:
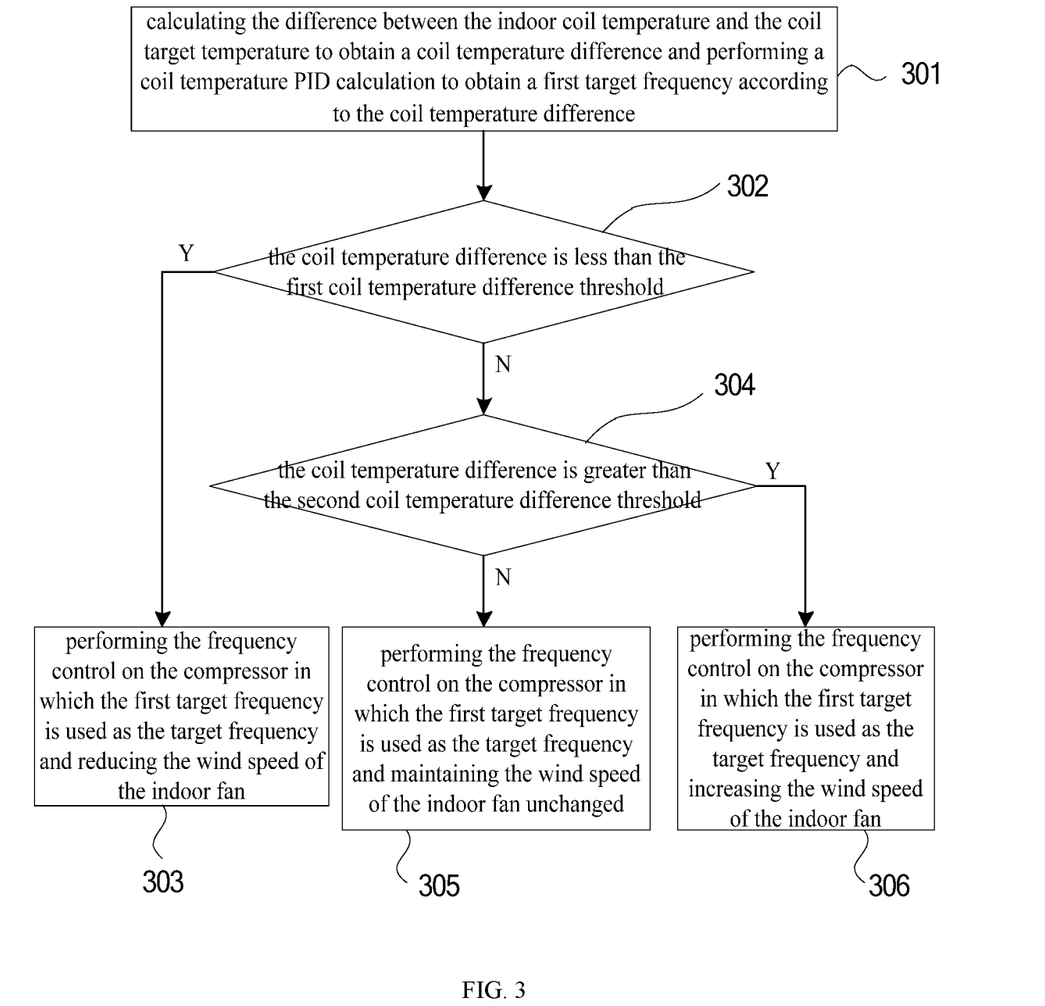
FIG. 3 is a flow chart showing a coil temperature control process in FIG. 1 and FIG. 2.

FIG. 3 shows a flow chart of the coil temperature control process included in FIG. 1 and FIG. 2; the flow chart specifically depicts the process for adjusting the wind speed and frequency in the situation that the user is not allowed to adjust preset wind speed manually.

As shown in FIG. 3, the coil temperature control process comprises:

Step 301: Calculating the difference between the indoor coil temperature and the coil target temperature to obtain a coil temperature difference; performing a coil temperature PID calculation to obtain a first target frequency according to the coil temperature difference.

The parameter definition and the specific process of the Step 301 could be referred to the detailed description of the embodiment shown in FIG. 1.

Step 302: determining whether the coil temperature difference is less than a first coil temperature difference threshold; if the coil temperature difference is less than the first coil temperature difference threshold, performing Step 303; otherwise, performing Step 304.

The first coil temperature difference threshold is a preset temperature threshold, and the first coil temperature difference threshold is less than 0° C., which is a threshold temperature that defines how much smaller the coil temperature is compared to the coil target temperature; as an example, the first coil temperature difference threshold could be set as −0.6° C.

Step 303: performing the frequency control on the compressor in which the first target frequency is used as the target frequency and reducing the wind speed of the indoor fan in the meanwhile.

Wherein if in Step 302 it was determined that the coil temperature difference is less than the first coil temperature difference threshold, it indicates that the current coil temperature is less than the coil target temperature and the difference between the current coil temperature and the coil target temperature is comparatively obvious, and the current coil temperature is much lower than expected. In order to increase the coil temperature to the coil target temperature in a shorter time, the first target frequency is used as the target frequency to control the compressor, and the wind speed of the air conditioner indoor fan is lowered so as to reduce the heat exchange of the coil.

Step 304: determining whether the coil temperature difference is greater than a second coil temperature difference threshold; if the coil temperature difference is greater than the second coil temperature difference threshold, performing Step 306; otherwise, performing Step 305.

If in the Step 302 it is determined that the coil temperature difference is not less than the first coil temperature difference threshold, it is further determined whether the coil temperature difference is greater than the second coil temperature difference threshold. The second coil temperature difference threshold is also a preset temperature threshold. The second coil temperature difference threshold is greater than 0° C., which is a threshold temperature that defines how much greater the coil temperature is compared to the coil target temperature; as an example, the second coil temperature difference threshold could be set as 0.6° C.

Step 305: performing the frequency control on the compressor in which the first target frequency is used as the target frequency and maintaining the wind speed of the indoor fan unchanged in the meanwhile.

If it is determined in Step 304 that the coil temperature difference is not greater than the second coil temperature difference threshold, and further because it is determined in Step 302 that the coil temperature difference is not less than the first coil temperature difference threshold, it indicates that the coil temperature is close to the coil target temperature. Under this condition, the first target frequency is used as the target frequency to control the compressor; and in the meanwhile, the wind speed of the indoor fan is being maintained unchanged, such that it could achieve a comfortable heating effect and there is no need to compensate the heating effect by adjusting the wind speed of the indoor fan.

Step 306: performing the frequency control on the compressor in which the first target frequency is used as the target frequency and increasing the wind speed of the indoor fan in the meanwhile.

If it is determined in the Step 304 that the coil temperature difference is greater than the second coil temperature difference threshold, it indicates that the current coil temperature is higher than the coil target temperature and the difference between the coil temperature and the coil target temperature is obvious, and the current coil temperature is too high. In order to reduce the coil temperature to the coil target temperature as soon as possible, the first target frequency is used as the target frequency to control the compressor; and in the meanwhile, the wind speed of the air conditioner indoor fan is increased to accelerate the heat exchange of the coil.

Figure 4:
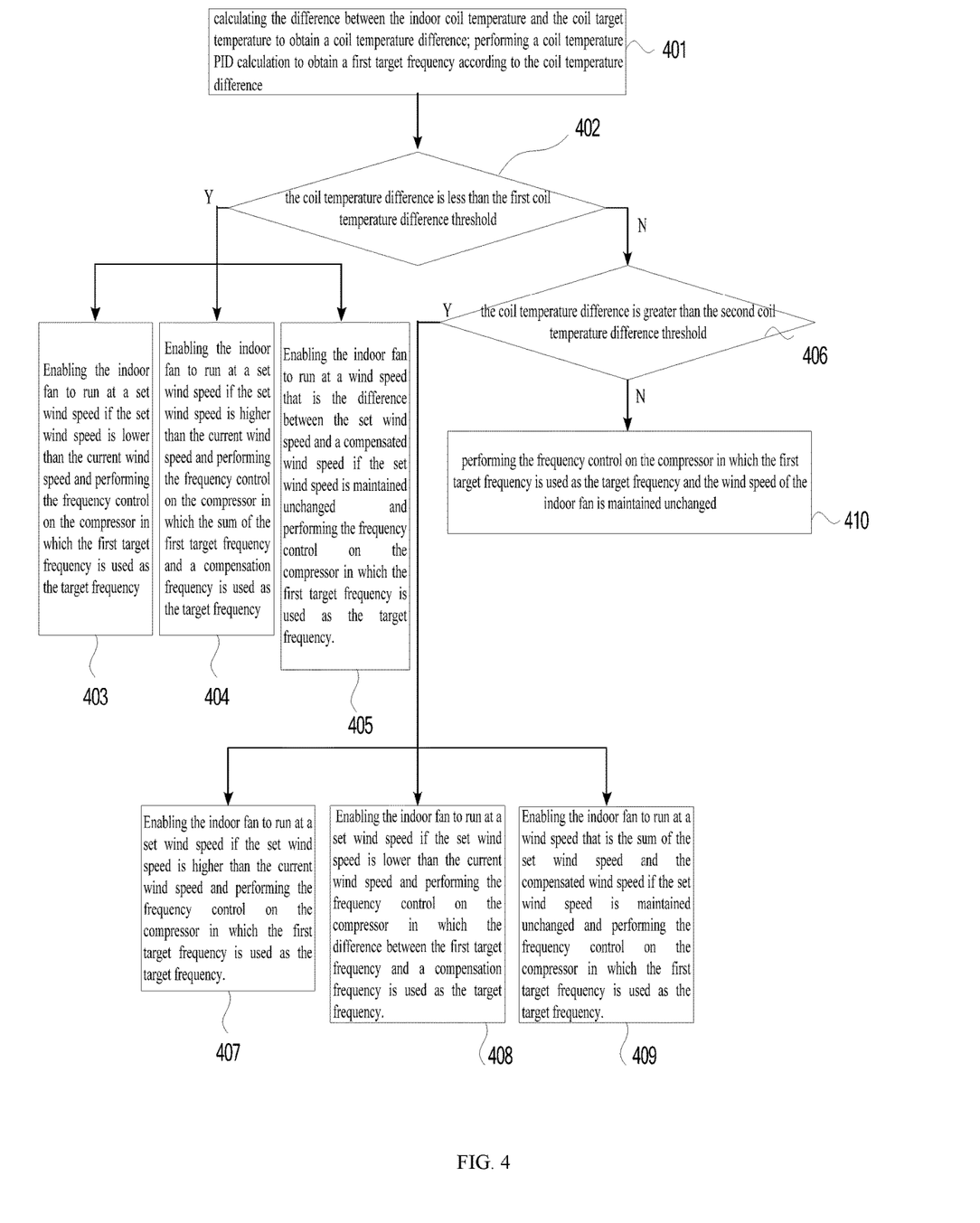
FIG. 4 is a flow chart showing another coil temperature control process in FIG. 1 and FIG. 2.

FIG. 4 shows a flow chart of the coil temperature control process included in FIG. 1 and FIG. 2; the flow chart specifically depicts the process for adjusting the wind speed and frequency in the situation that the user is allowed to adjust preset wind speed.

As shown in FIG. 4, the coil temperature control process comprises:

Step 401: Calculating the difference between the indoor coil temperature and the coil target temperature to obtain a coil temperature difference; performing a coil temperature PID calculation to obtain a first target frequency according to the coil temperature difference.

The parameter definition and the specific process of the Step 401 could be referred to the detailed description of the embodiment shown in FIG. 1.

Step 402: determining whether the coil temperature difference is less than a first coil temperature difference threshold; if the coil temperature difference is less than the first coil temperature difference threshold, performing Step 403, or Step 404, or Step 405; otherwise, performing Step 406.

The first coil temperature difference threshold is a preset temperature threshold, and the first coil temperature difference threshold is less than 0° C., which is a threshold temperature that defines how much smaller the coil temperature is compared to the coil target temperature; as an example, the first coil temperature difference threshold could be set as −0.6° C. If the coil temperature difference is less than the first coil temperature difference threshold, it indicates that the current coil temperature is less than the coil target temperature and the difference between the current coil temperature and the coil target temperature is obvious and the current coil temperature is comparatively low. In order to achieve a more comfort heating effect, it requires raising the coil temperature to the coil target temperature as soon as possible. Considering that the user may adjust the indoor unit set wind speed during the coil temperature control process, the control process of Step 403 or Step 404 or Step 405 will be employed depending on whether the set wind speed is changed.

Step 403: Enabling the indoor fan to run at a set wind speed if the set wind speed is lower than the current wind speed and performing the frequency control on the compressor in which the first target frequency is used as the target frequency.

Under the condition that the coil temperature difference is less than the first coil temperature difference threshold, if the set wind speed becomes smaller, it indicates that the user manually reduce the set wind speed. Since the coil temperature difference is less than the first coil temperature difference threshold, such that the current coil temperature is also less than the coil target temperature, in order to raise the coil temperature to the coil target temperature as soon as possible, it is helpful to reduce the wind speed of the indoor fan, and the user as well operate the same way to decrease the wind speed of the indoor unit. Therefore, for balancing the user's controllability and heating comfort, the indoor unit is being controlled to operate at the set wind speed after being reduced. Similarly, the first target frequency is used as the target frequency to control the compressor.

Step 404: Enabling the indoor fan to run at a set wind speed if the set wind speed is higher than the current wind speed and performing the frequency control on the compressor in which the sum of the first target frequency and a compensation frequency is used as the target frequency.

Under the condition that the coil temperature difference is less than the first coil temperature difference threshold, if the set wind speed becomes higher, it indicates that the user manually increase the set wind speed. Since the coil temperature difference is less than the first coil temperature difference threshold, such that the current coil temperature is also less than the coil target temperature, in order to raise the coil temperature to the coil target temperature as soon as possible, it is helpful to reduce the wind speed of the indoor fan, but the user oppositely operate the other way to increase the wind speed of the indoor unit. Therefore, for balancing the user's controllability and heating comfort, the indoor unit is being controlled to operate at a set wind speed after being increased. On the other hand, in order to still raise the coil temperature to the coil target temperature as soon as possible, it still needs to perform a mandatory frequency control on the compressor: firstly, calculating the sum of the first target frequency obtained in Step 401 and a compensation frequency, and secondly, performing the frequency control on the compressor in which the sum of the first target frequency and the compensation frequency is used as the target frequency, wherein the compensation frequency is greater than 0 Hz, which is a preset frequency value and could be set within a preset range from 3 Hz to 10 Hz. In this way, the first target frequency calculated from the coil temperature PID algorithm is being compensated, so that the frequency of the compressor is being increased for raising the coil temperature to the coil target temperature in a shorter time and the heating effect is improved.

Step 405: Enabling the indoor fan to run at a wind speed that is the difference between the set wind speed and a compensated wind speed if the set wind speed is maintained unchanged and performing the frequency control on the compressor in which the first target frequency is used as the target frequency.

Under the condition that the coil temperature difference is less than the first coil temperature difference threshold, if the set wind speed is maintained unchanged, it indicates that the user does not manually adjust the wind speed. Therefore, it is helpful to raise the coil temperature to the coil target temperature in a shorter time by means of reducing the wind speed of the indoor fan. To be specific, calculating the difference between the current set wind speed and a compensated wind speed and enabling the indoor fan to run at the wind speed with the value equal to the wind speed difference and performing the frequency control on the compressor in which the first target frequency is used as the target frequency. Wherein, the compensated wind speed is a preset value higher than 0 rpm. The wind speed compensation could reduce the current wind speed of the indoor fan so as to suppress heat transfer from the coil and enable the coil temperature to rise to the coil target temperature in a shorter time.

Step 406: determining whether the coil temperature difference is greater than the a second coil temperature difference threshold; if it is determined that the coil temperature difference is greater than the second coil temperature difference threshold, performing Step 407 or Step 408 or Step 406; otherwise performing Step 410.

Wherein if in Step 402 it is determined that the coil temperature difference is equal to or greater than the first coil temperature difference threshold, it requires to further determine whether the coil temperature difference is greater than a second coil temperature difference threshold. The second coil temperature difference threshold is also a preset temperature threshold which is greater than 0° C. and it indicates how much greater the coil temperature is compared to the coil target temperature, as an example, the second coil temperature difference could be set as 0.6° C.

If the coil temperature difference is greater than the second coil temperature difference threshold, it indicates that the current coil temperature is higher than the coil target temperature and the difference between the current coil temperature and the coil target temperature is obvious and the current coil temperature is comparatively high. In order to achieve a more comfort heating effect, it requires reducing the coil temperature to the coil target temperature as soon as possible. Considering that the user may adjust the indoor unit set wind speed during the coil temperature control process, the control process of Step 407 or Step 408 or Step 409 will be employed depending on whether the set wind speed is changed.

Step 407: Enabling the indoor fan to run at a set wind speed if the set wind speed is higher than the current wind speed and performing the frequency control on the compressor in which the first target frequency is used as the target frequency.

Under the condition that the coil temperature difference is greater than the second coil temperature difference threshold, if the set wind speed becomes greater, it indicates that the user manually increase the set wind speed. Since the coil temperature difference is greater than the second coil temperature difference threshold, such that the current coil temperature is also greater than the coil target temperature, in order to reduce the coil temperature to the coil target temperature as soon as possible, it is helpful to increase the wind speed of the indoor fan, and the user as well operate the same way to increase the wind speed of the indoor unit. Therefore, for balancing the user's controllability and heating comfort, the indoor unit is being controlled to operate at a set wind speed after being increased. Similarly, the first target frequency is used as the target frequency to control the compressor.

Step 408: Enabling the indoor fan to run at a set wind speed if the set wind speed is lower than the current wind speed and performing the frequency control on the compressor in which the difference between the first target frequency and a compensation frequency is used as the target frequency.

Under the condition that the coil temperature difference is greater than the second coil temperature difference threshold, if the set wind speed becomes smaller, it indicates that the user manually reduce the set wind speed. Since the coil temperature difference is greater than the first coil temperature difference threshold, such that the current coil temperature is also greater than the coil target temperature, in order to reduce the coil temperature to the coil target temperature as soon as possible, it is helpful to increase the wind speed of the indoor fan, but the user oppositely operate the other way to decrease the wind speed of the indoor unit. Therefore, for balancing the user's controllability and heating comfort, the indoor unit is being controlled to operate at a set wind speed after being decreased. On the other hand, in order to still reduce the coil temperature to the coil target temperature as soon as possible, it still needs to perform a mandatory frequency control on the compressor: firstly, calculating the difference of the first target frequency obtained in Step 401 and a compensation frequency, and secondly, performing the frequency control on the compressor in which the difference of the first target frequency and the compensation frequency is used as the target frequency, In this way, the first target frequency calculated from the coil temperature PID algorithm is being compensated, so that the frequency of the compressor is being decreased for reducing the coil temperature to the coil target temperature in a shorter time and the heating effect is improved.

Step 409: Enabling the indoor fan to run at a wind speed that is the sum of the set wind speed and the compensated wind speed if the set wind speed is maintained unchanged and performing the frequency control on the compressor in which the first target frequency is used as the target frequency.

Under the condition that the coil temperature difference is greater than the second coil temperature difference threshold, if the set wind speed is maintained unchanged, it indicates that the user does not manually adjust the wind speed. Therefore, it is helpful to reduce the coil temperature to the coil target temperature in a shorter time by means of increasing the wind speed of the indoor fan. To be specific, calculating the sum of the current set wind speed and the compensated wind speed and enabling the indoor fan to run at the wind speed with the value equal to the sum and performing the frequency control on the compressor in which the first target frequency is used as the target frequency. The wind speed compensation could increase the current wind speed of the indoor fan so as to accelerate heat transfer from the coil and enable the coil temperature to decrease to the coil target temperature in a shorter time.

Step 410: performing the frequency control on the compressor in which the first target frequency is used as the target frequency and the wind speed of the indoor fan is maintained unchanged.

If those are determined in the Step 406 that the coil temperature difference is less than or equal to the second coil temperature difference threshold, and in the Step 402 the coil temperature difference is greater than or equal to the first coil temperature difference threshold, it indicates that the coil temperature and the coil target temperature are very close. Under this condition the first target frequency is used as the target frequency to control the compressor and the wind speed of the indoor fan is maintained unchanged and a comfortable heating effect could be achieved with no need of extra adjustment on the wind speed or frequency.

It will nevertheless be understood that no limitation of the scope of the invention is thereby intended. Any alternations and further modification in the described embodiments, and any further applications of the principles of the invention as described herein are contemplated as would normally occur to one skilled in the art to which the invention relates.

The invention claimed is:

1. A heating mode control method of an air conditioner comprising:
   obtaining an indoor temperature and calculating the difference between the indoor temperature and an indoor target temperature to obtain an indoor temperature difference associated with the air conditioner that is running in a heating mode;
   performing a coil temperature control process when the indoor temperature difference is within a set indoor temperature difference range, wherein the coil temperature control process including:
   obtaining an indoor coil temperature and controlling the frequency of a compressor of the air conditioner according to the indoor coil temperature and a coil target temperature;
   wherein the control of the compressor frequency according to the indoor coil temperature and the coil target temperature comprises:
   calculating the difference between the indoor coil temperature and the coil target temperature to obtain a coil temperature difference;
   performing a coil temperature proportional-integral-derivative (PID) calculation to obtain a first target frequency according to the coil temperature difference; and
   performing a frequency control on the compressor in which the first target frequency is used as the target frequency;
   wherein the coil temperature control process comprises:
   if the coil temperature difference is less than a first coil temperature difference threshold, performing the frequency control on the compressor in which the first target frequency is used as the target frequency and reducing the wind speed of an indoor fan of the air conditioner; wherein the first coil temperature difference threshold is set at less than 0° C.;
   if the coil temperature difference is greater than a second coil temperature difference threshold, performing the frequency control on the compressor in which the first target frequency is used as the target frequency and increasing the wind speed of the indoor fan; wherein the second coil temperature difference threshold is set at greater than 0° C.; and
   if the coil temperature difference is not greater than the second coil temperature difference threshold, performing the frequency control on the compressor in which the first target frequency is used as the target frequency and maintaining the wind speed of the indoor fan unchanged.

2. The method according to claim 1, wherein:
   the coil temperature control process comprises:
   if the coil temperature difference is less than a first coil temperature difference threshold, enabling the indoor fan to run at a set wind speed if the set wind speed is lower than the current wind speed and performing the frequency control on the compressor in which the first target frequency is used as the target frequency;
   wherein the first coil temperature difference threshold is set at less than 0° C.;
   if the coil temperature difference is less than the first coil temperature difference threshold, enabling the indoor fan to run at a set wind speed if the set wind speed is higher than the current wind speed and performing the frequency control on the compressor in which the sum of the first target frequency and a compensation frequency is used as the target frequency; wherein the compensation frequency is greater than 0 Hz;

if the coil temperature difference is less than the first coil temperature difference threshold, enabling the indoor fan to run at a wind speed that is the difference between the set wind speed and a compensated wind speed if the set wind speed is maintained unchanged and performing the frequency control on the compressor in which the first target frequency is used as the target frequency, wherein the compensated wind speed is higher than 0 rpm.

3. The method according to claim 2, wherein:
the coil temperature control process comprises:
if the coil temperature difference is greater than a second coil temperature difference threshold, enabling the indoor fan to run at a set wind speed if the set wind speed is higher than the current wind speed and performing the frequency control on the compressor in which the first target frequency is used as the target frequency, wherein the second coil temperature difference threshold is set at greater than 0° C.;

if the coil temperature difference is greater than the second coil temperature difference threshold, enabling the indoor fan to run at a set wind speed if the set wind speed is lower than the current wind speed and performing the frequency control on the compressor in which the difference between the first target frequency and the compensation frequency is used as the target frequency;

if the coil temperature difference is greater than the second coil temperature difference threshold, enabling the indoor fan to run at a wind speed that is the sum of the set wind speed and the compensated wind speed if the set wind speed is maintained unchanged and performing the frequency control on the compressor in which the first target frequency is used as the target frequency.

4. The method according to claim 3, wherein:
the coil temperature control process comprises:
if the coil temperature difference is greater than or equal to the first coil temperature difference threshold and the coil temperature difference is less than or equal to the second coil temperature difference threshold, performing the frequency control on the compressor in which the first target frequency is used as the target frequency and the wind speed of the indoor fan is maintained unchanged.

5. The method according to claim 1, wherein:
the set indoor temperature difference range is [−t1° C., t2° C.], wherein t1 and t2 satisfying: 0<t1<t2.

6. The method according to claim 5, wherein:
if the indoor temperature difference is lower than −t1° C., performing a room temperature control process which includes:
performing a room temperature proportional-integral-derivative (PID) calculation to obtain a second target frequency according to the indoor temperature difference, performing a frequency control on the compressor of air conditioner in which the second target frequency is used as the target frequency.

7. The method according to claim 6, wherein:
in the room temperature control process, controlling the indoor fan to run at a set wind speed.

8. The method according to claim 5, wherein:
if the indoor temperature is greater than t2° C., controlling the compressor to run at a minimum frequency and controlling the indoor fan to run at a minimum wind speed.

\* \* \* \* \*